3,346,455
LISTERIA-CONTAINING VACCINE
Jean R. Boatright, 1912 S. Vine St., Urbana, Ill. 61801, and Joe L. Streckfuss, Rte. 2, Carterville, Ill. 62918
No Drawing. Continuation of application Ser. No. 383,215, July 16, 1964. This application Apr. 11, 1966, Ser. No. 541,522
17 Claims. (Cl. 167—78)

This invention relates generally to a polyvalent vaccine, and, more particularly, to a Listeria-containing vaccine incorporating Staphylococcus and Streptococcus antigens, which is effective both as a therapeutic and prophylactic agent in the treatment in human beings of not only Staphylococcus and Streptococcus infections but of certain other diseases different from those whose antigens are present in the vaccine. This application is a continuation of our copending application Ser. No. 383,215, filed July 16, 1964, now abandoned, which is a continuation of our copending application Ser. No. 197,287, filed May 24, 1962, now abandoned.

Polyvalent vaccines, i.e., vaccines containing antigens of several different organisms, have been known for some time, and in many instances have been shown to be effective to a satisfactory degree against some or all diseases caused by bacteria or viruses whose antigens were present in such vaccine. However, it frequently happens that a patient is invaded by bacteria of several different genera or by a particularly resistant species of a given genus, so that a vaccine containing the antigens of only one of such genera, or of a different species from that being treated, fails to promote the generation of an effective number of the proper antibodies in the patient.

We have found that a vaccine containing antigens of Listeria monocytogenes, Staphylococci and Streptococci is capable of enhancing the constitutional response of the human organism to infection and stress by stimulation of the reticulo-endothelial system, by production of antibodies and by adreno-corticotropic or cortisone-like effects. We have further found that a vaccine of this type is capable of producing a salutary effect in human infections associated with types of infectious organisms whose antigens are not identical with those in the original vaccine. Thus, this type of vaccine is effective not only against Staphylococcus and Streptococcus infections, but also against certain bacteria of genera different from those used in preparing the vaccine. Moreover, in keeping with the aforementioned general properties of the present vaccines, these vaccines have the unexpected capability of producing the desired therapeutic response very quickly (i.e., in a matter of about 9 to 12 days) as compared with the usual vaccine effect which ordinarily requires from 4 to 8 weeks to manifest itself.

Objects of the invention are to provide a Listeria-containing vaccine having the properties and capabilities mentioned immediately above; to provide a method of making such a vaccine; and to provide a method of treating human infections by the administration to affected human beings of the present Listeria-containing vaccine. Other objects and advantages of the invention will become apparent from the following description wherein presently preferred embodiments of the invention are set forth.

*Preparation of vaccine*

Pure cultures of the following organisms were inoculated into separate quantities of 400 ml. of BBL Trypticase Soy Broth (01–1962), a dehydrated bacterial medium produced commercially by Baltimore Biological Laboratories, Division of Beckman Dickinson Co., Baltimore, Md., and were incubated for 24 hours at 37° C.:

| | Type |
|---|---|
| Beta-Streptococcus | A |
| Staphylococcus aureus | 44A |
| Listeria monocytogenes | 1 |

After the incubation period, the suspensions were cooled to 2° to 4° C. and separately centrifuged at 8000 revolutions per minute to cause the organisms to settle, after which the supernates were drawn off and discarded. The resulting residues of sedimented organisms were washed by suspending them separately in 40 ml. of a solution of one part of formalin (37% formaldehyde in water) in 999 parts of saline (0.85% NaCl in water), by volume, at 2° to 4° C., and centrifuging at 8000 revolutions per minute. The supernates resulting from such washing steps were discarded and the residues respectively resuspended in 40 ml. of the formalin-saline at 2° to 4° C. and centrifuged again under the same conditions. The supernate from each resulting centrifuged culture was again discarded and the respective residues were subjected to the aforementioned centrifuging-washing step two additional times. The residues from the final centrifuging steps were again separately resuspended in the formalin-saline solution, and the respective suspensions standardized with the McFarland nephelometer to tube #2 (600 million organisms/ml.).

Each of the resulting standardized bacterial suspensions in formalin-saline was then incubated at 37° C. for 24 hours, after which the three suspensions were combined in the proper proportions to give the final vaccine a count of about 600 million organisms/ml., the distribution being 43% Staphylococci, 43% Streptococci, and 14% Listeria monocytogenes. The resulting vaccine was bottled in 40 ml. quantities and heated in a water bath at 48° C. for one hour to insure the death of the microorganisms. Thereafter the bottled vaccine was frozen at −2° C. for 12 hours and then stored at 2° to 4° C. awaiting use. In the preparation of the vaccine by the method just described the organisms are killed. The formaldehyde in the vehicle employed acts as a preservative and also converts any possible residual toxins to toxoids. Those skilled in the art will understand that somewhat different concentrations of formaldehyde and sodium chloride, from those specified above, may be used in preparing the vaccine, if desired. Also, formalin containing a small quantity of methanol, e.g., 10–15%, may be used instead of the above-described aqueous formaldehyde solution. Moreover, instead of the formalin-saline vehicle described above, any other parenterally suitable vehicle capable of killing and preserving the microorganisms, and of maintaining their antigenic capacity, may be used, provided of course such vehicle has the necessary low toxicity.

The bottles of vaccine prepared as above were separately cultured in BBL Trypticase Soy Broth (01–162) and were demonstrated thereby to be free of viable microorganisms.

*Clinical evaluation*

The following table sets forth the clinical results obtained by use of the vaccine, prepared as described above, in the treatment of various patients afflicted with the infections noted. In the table the "standard" dosage comprises four intramuscular injections of 0.1 ml., 0.2 ml., 0.4 ml., and 0.8 ml. given at 3-day intervals. The booster injections comprised 0.8 ml. given 30 days after the last sequential injection. All booster injections were given at 30-day intervals unless otherwise specified. All injections were administered with 0.3 ml. xylocaine (0.5%). In the ratings given in the table showing therapeutic effect, "excellent" indicates marked salutary effect with apparent return to normal; "good" indicates mild subjective symptoms, e.g., scratchy throat, but normal in appearance; "poor" indicates no response to the treatment.

CLINICAL EVALUATION

| Patient | Age | Sex | Diagnosis | Culture | Dosage | Therapeutic Effect | Side Effects | Occupation |
|---|---|---|---|---|---|---|---|---|
| W.B. | 42 | F | Chronic pharyngitis and tonsilitis. | Hemolytic Staph. | Standard | Excellent | None | Nurses' Aid. |
| P.B. | 21 | F | Chronic pharyngitis recurrent. | Beta-Strept; Hemolytic Staph. | do | Good | Mod. tenderness at injection site with booster dose. | Teacher. |
| C.D. | 38 | F | Chronic pharyngitis following Influenza A and B. | Hemolytic Staph. | 0.2 cc., 0.5 cc., 0.1 cc. at weekly intervals. | Poor | Procedure discontinued because of headache; general malaise. | Housewife. |
| W.S. | 55 | M | Furunculosis recurrent after several courses of antibiotics. | None, Apparently Staph. | Standard | Excellent | None | Laborer. |
| R.B. | 24 | M | Furunculosis rt. axilla. | None, Apparently Staph. | do | Could not be evaluated. | do | Student Evaluation Appm'ts not kept. |
| A.E. | 42 | M | Chronic Osteomyelitis rt. tibia. | Hemolytic Staph. | Standard, plus one booster. | No response after 6 weeks. | do | Carpenter. |
| J.K. | 21 | F | Acute and chronic pharyngitis; infectious mononucleosis. | Beta-Strept.; hemolytic Staph. | Standard | Normal conval. without sequela; still under observ. | do | Musician. |
| C.B. | 35 | M | Furunculosis | None | do | Excellent | do | Farmer. |

CULTURAL EVALUATION

| Patient | Age | Sex | Diagnosis | Culture | Dosage | Therapeutic Effect | Side Effects | Occupation |
|---|---|---|---|---|---|---|---|---|
| D.R. | 50 | F | Chronic bacterial blepharitis; secondary keratoconjunctivitis, recurring attacks 8 yrs. | Hemolytic Staph. | Standard | Excellent | Nausea, vomiting; headache; chill after first inj. | Housewife. |
| A.H. | 38 | F | Reoccurrent hordeolum, eyelids, several yrs. duration. | None, clinical—probably Staph. | do | do | None | Do. |
| I.L. | 13 | F | Chronic keratoconjunctivitis, 1 yr. duration. | Hemolytic Staph. | do | do | do | Student. |
| O.L. | 51 | F | Chronic conjunctivitis. | Nonhemolytic Staph. | do | do | do | Housewife. |
| H.H. | 50 | M | do | Hemolytic Staph. | do | do | do | Farmer. |
| J.R.B. | 34 | M | Chronic pharyngitis | Hemolytic Staph.; Beta-Strept. | Standard, plus 3 boosters. | do | do | Physician. |
| J.W.R. | 31 | M | do | Beta-Strept. | Standard, plus 2 boosters. | do | do | Hospital Tech. |
| R.B. | 24 | M | Acne | None | Standard, no booster. | No noticeable improvement. | do | Life-guard. |
| J.Y. | 28 | F | Chronic pharyngitis | Beta-Strept. | Standard | do | do | Nurses' Aid. |
| B.R.M. | 24 | M | Normal Control | Beta-Strept. | do | do | do | Teacher. |
| A.M. | 31 | F | Acute pharyngitis; recurrent. | Beta-Strept.; hemolytic Staph. | Standard plus 1 extra booster. | Excellent | Mild erythema at site of injection. | Housewife. |

We claim:

1. A vaccine comprising a suspension, in a dilute aqueous solution of formaldehyde and sodium chloride, of killed *Listeria monocytogenes,* Streptococcus and Staphylococcus organisms, the *Listeria monocytogenes* being present as a minor proportion of the total of said killed organisms, said Streptococcus and Staphylococcus organisms being present in substantially equal proportions.

2. A vaccine comprising a suspension, in a dilute aqueous solution of formaldehyde and sodium chloride, of killed *Listeria monocytogenes,* Beta-Streptococcus and *Staphylococcus aureus* organisms, the *Listeria monocytogenes* being present as a minor proportion of the total of said killed organisms, the total of said killed organisms being about 600 million per ml.

3. A vaccine in accordance with claim 2 wherein said killed Beta-Streptococcus and *Staphylococcus aureus* organisms are present in substantially equal proportions.

4. A vaccine comprising a suspension of killed microorganisms in a dilute aqueous solution of formaldehyde and sodium chloride, said microorganisms being present in said solution in a concentration of about 600 million per ml. and comprising about 43% *Staphylococcus aureus,* 43% Beta-Streptococci, and 14% *Listeria monocytogenes.*

5. A method of preparing a vaccine comprising separately propagating *Listeria monocytogenes, Staphylococci aureus* and Beta-Streptococci in dehydrated bacterial media, washing the respective cultures at least four times by successive suspensions in a dilute aqueous solution of formaldehyde and sodium chloride, followed by centrifuging, preparing a suspension in said solution, of each residue of microorganisms resulting from the final centrifuging step, the concentration of microorganisms in said last mentioned suspensions being about 600 million/ml., combining portions of said last mentioned suspensions to produce a mixed suspension wherein the *Listeria monocytogenes* is present in minor proportion and the mixture of said *Staphylococci aureus* and said Beta-Streptococci is present in major proportion, and heating the resulting mixed suspension at about 48° C. for about one hour.

6. In the production of a vaccine, the method of treating *Listeria monocytogenes, Staphylococcus aureus,* and Beta-Streptococcus bacteria for the production of antigenic components of said vaccine, comprising the step of incubating separate suspensions of each of said bacteria in a dilute aqueous solution of formaldehyde and sodium chloride at about 37° C.

7. The method in accordance with claim 6, including the additional steps of combining portions of said incubated suspensions and heating the resulting combined suspension to about 48° C. for about one hour.

8. A method of treating human infections, comprising the parenteral administration to a human patient of a vaccine comprising a suspension of killed *Listeria monocytogenes,* Streptococcus and Staphylococcus organisms in a dilute aqueous solution of formaldehyde and sodium chloride.

9. The method of treating human infections comprising the parenteral administration to a human patient sequentially, in about 3-day intervals, of doses of 0.1 ml., 0.2 ml., 0.4 ml., and 0.8 ml. of a vaccine comprising a suspension of killed *Listeria monocytogenes,* Streptococcus, and Staphylococcus organisms in a dilute aqueous solution of formaldehyde and sodium chloride, the *Listeria monocytogenes* being present in a minor proportion of the total concentration of said killed organisms, and the Streptococcus and Staphylococcus being present in substantially equal amounts.

10. The method of treating human infections comprising the parenteral administration to a human patient sequentially, in about 3-day intervals, of doses of about 0.1 ml., 0.2 ml., 0.4 ml., and 0.8 ml. of a vaccine comprising a suspension of killed *Listeria monocytogenes,* Beta-Streptococcus and *Staphylococcus aureus* organisms in a dilute aqueous solution of formaldehyde and sodium chloride, the total of said killed organisms in said vaccine being about 600 million per ml. of which about 43% are *Staphylococcus aureus,* about 43% are Beta-Streptococci and about 14% are *Listeria monocytogenes.*

11. A vaccine comprising a suspension, in a parenterally suitable liquid vehicle, of killed *Listeria monocytogenes,* Streptococcus and Staphylococcus organisms.

12. A vaccine component comprising a mixture of the following killed organisms: *Listeria monocytogenes,* Streptococcus and Staphylococcus.

13. A vaccine comprising a mixture, with a parenterally suitable vehicle, of killed *Listeria monocytogenes,* Streptococcus and Staphylococcus organisms.

14. A vaccine in accordance with claim 11, wherein said *Listeria monocytogenes* is present as a minor proportion of the total of said killed organisms.

15. A vaccine comprising a suspension, in a dilute formalin-saline solution, of killed *Listeria monocytogenes,* Streptococcus and Staphylococcus organisms, the *Listeria monocytogenes* being present as a minor proportion of the total of said killed organisms.

16. A method of treating human infections, comprising the parenteral administration to a human patient of a vaccine comprising a suspension of killed *Listeria monocytogenes,* Streptococcus and Staphylococcus organisms in a parenterally suitable liquid vehicle.

17. A method of treating human infections comprising artificially stimulating the reticulo-endothelial system of a human patient, wherein said stimulation is effected by injection into said patient of a vaccine consistng essentially of killed *Listeria monocytogenes,* Streptococcus and Staphylococcus organisms.

References Cited

Fraser, "Antibody in Glandular-Fever Sera to an Antigen Common to Streptococci and Staphylococci," J. Path. Bact. 67, pp. 301–9, April 1954.

Graham et al., "Studies on Listerella. IV. Unsuccessful Attempts at Immunization With Living and Dead Listerella Cultures," Cornell Vet. 30: 291–298 (1940).

Hasenclever et al., "Immunization of Mice Against *Listeria Monocytogenes,*" J. Bact. 74 (5): 584–586, November 1957.

Neter et al., "Identification of an Antigen Common to *Listeria Monocytogenes* and Other Bacteria," Proc. Soc. Exp. Biol. Med. 105, pp. 131–4, October 1960.

Olson et al., "An Attempt To Immunize Sheep During an Outbreak of Listerosis," Am. J. Vet. Res. 12 (45); 306–313, October 1951.

Osebold et al., "Immunization Studies on Listerosis in Mice," J. Immun. 78 (4): 262–8, April 1957.

Sachse et al., "Cross-Reactions Between Hemosensitinsoof Streptococci and Listeria," Zschr. Immunforsch (Jena), 114, pp. 472–85, December 1957 (in German).

Seeliger et al., "Antigenic Relationships Between *Listeria Monocytogenes* and *Staphylococcus Aureus,*" Canad. J. Microb. 2, pp. 220–31, May 1956.

Seeliger, "Serological Cross-Reaction Between *Listeria Monocytogenes* and Enterococcus," Zschr. Hyg. Infektr. (Berlin) 141, pp. 15–24 (1955) (in German).

Welshimer, "Staphylococcal Antibody Production in Response to Injections With *Listeria Monocytogenes,*" J. Bact. 79, p. 456–7, March 1960.

LEWIS GOTTS, *Primary Examiner.*

S. K. ROSE, *Assistant Examiner.*